(12) United States Patent
Scheps (10) Patent No.: US 7,628,509 B1
(45) Date of Patent: Dec. 8, 2009

(54) VARIABLE COLOR LED OPTICAL SOURCE

(75) Inventor: Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 134 days.

(21) Appl. No.: 11/455,121

(22) Filed: Jun. 16, 2006

(51) Int. Cl.
*F21V 1/00* (2006.01)
*F21V 11/00* (2006.01)
*G02B 27/10* (2006.01)
*G02B 27/12* (2006.01)

(52) U.S. Cl. .................. 362/235; 362/236; 362/242; 359/618; 359/639

(58) Field of Classification Search ......... 362/235–248; 359/618, 639
See application file for complete search history.

(56) References Cited

U.S. PATENT DOCUMENTS

| | | | | |
|---|---|---|---|---|
| 4,460,940 A | * | 7/1984 | Mori | 362/558 |
| 4,800,556 A | * | 1/1989 | Charlier et al. | 398/86 |
| 4,917,453 A | * | 4/1990 | Block et al. | 362/553 |
| 6,072,573 A | * | 6/2000 | Kruger et al. | 356/213 |
| 6,259,560 B1 | * | 7/2001 | Scheps | 359/485 |
| 6,268,919 B1 | * | 7/2001 | Meeks et al. | 356/630 |
| 6,350,041 B1 | * | 2/2002 | Tarsa et al. | 362/231 |
| 6,554,463 B2 | * | 4/2003 | Hooker et al. | 362/555 |
| 6,637,905 B1 | * | 10/2003 | Ng et al. | 362/601 |
| 2003/0194189 A1 | * | 10/2003 | Grothe et al. | 362/577 |
| 2006/0007406 A1 | * | 1/2006 | Adkins et al. | 353/82 |

* cited by examiner

*Primary Examiner*—Sandra L O'Shea
*Assistant Examiner*—William J Carter
(74) *Attorney, Agent, or Firm*—Kyle Eppele; J. Eric Anderson (57) ABSTRACT

The variable color LED optical source comprises first, second, and third LEDs, each disposed to generate a linearly polarized optical signal; a first beam splitter cube that is optically coupled to the first and second LEDs; a first half-wave plate that is optically coupled to the first beam splitter cube so that it is capable of rotating the polarization orientation of an optical signal emitted from the first beam splitter cube; a second half-wave plate that is optically coupled to the third LED so that it is capable of rotating the polarization orientation of the third optical signal; and a second beam splitter cube that is optically coupled to the first and second half-wave plates so that the second beam splitter cube is capable of emitting a fourth optical signal.

20 Claims, 6 Drawing Sheets

VARIABLE COLOR LED OPTICAL SOURCE

FEDERALLY-SPONSORED RESEARCH AND DEVELOPMENT

The Variable Color LED Optical Source was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 82962.

BACKGROUND

Most visible light sources are either blackbody heat-generating sources or monochromatic solid-state sources. A need exists for a solid-state, variable-color optical source.

BRIEF DESCRIPTION OF THE DRAWINGS

Throughout the several views, like elements are referenced using like references.

DESCRIPTION OF EMBODIMENTS

Figure 1:
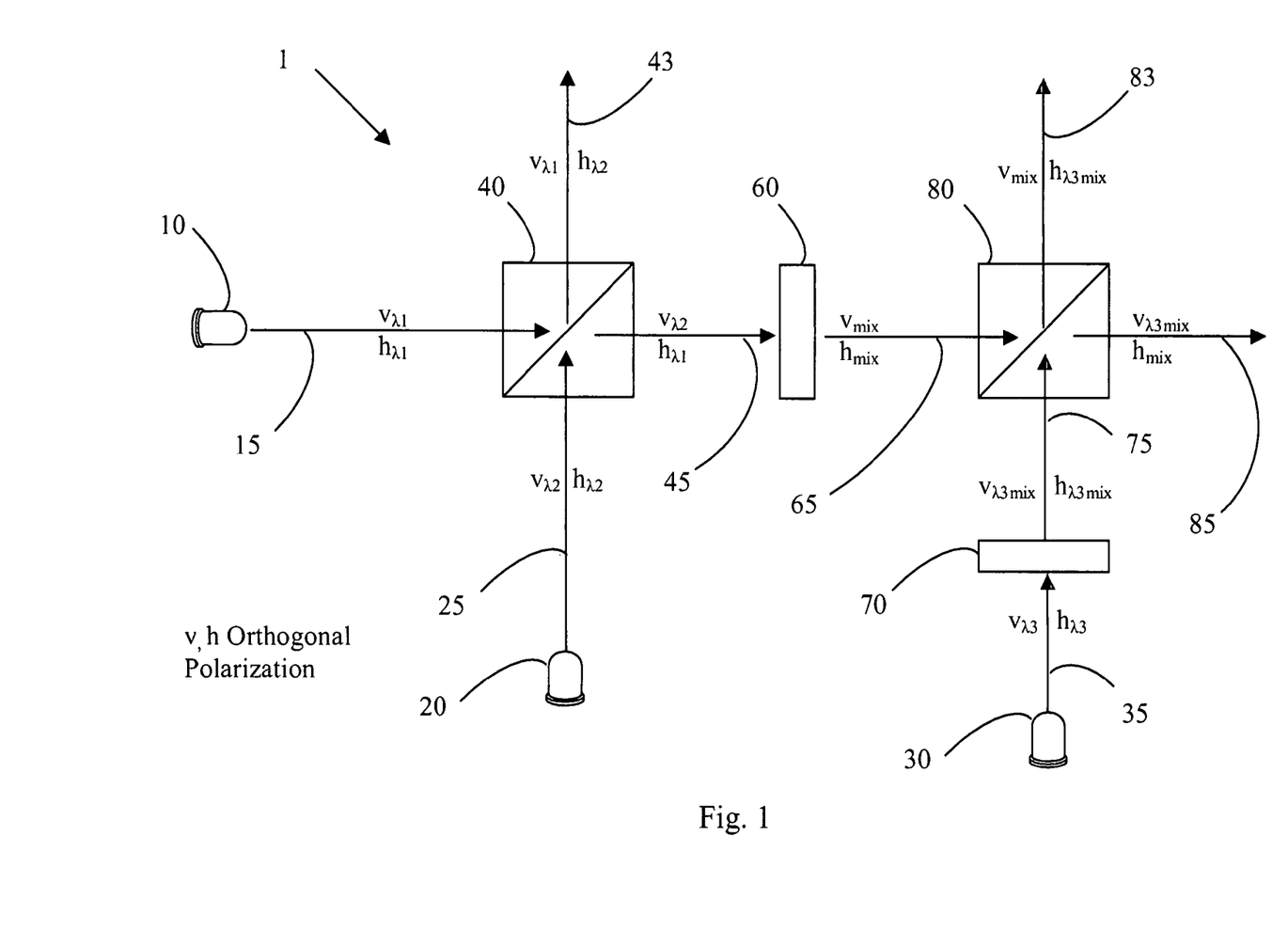
FIG. 1 illustrates one embodiment of a variable-color LED optical source showing three LEDs, two half-wave plates, and two beam splitter cubes.

FIG. 1 depicts one embodiment of a variable-color LED optical source, shown as system 1. System 1 processes three optical signals 15, 25, and 35, which have primary-color wavelengths $\lambda_1$, $\lambda_2$, and $\lambda_3$ respectively, to provide a variable-color optical signal 85. System 1 comprises first, second, and third LEDs (light emitting diodes) 10, 20, and 30; first and second polarizing beam splitter cubes (BSCs) 40 and 80; and two half-wave plates 60 and 70. The first LED 10, which is optically coupled to the first BSC 40, produces optical signal 15. The second LED 20, which is also optically coupled to the first BSC 40, produces optical signal 25. The third LED 30, which is optically coupled to the second half-wave plate 70, produces optical signal 35. Wavelengths $\lambda_1$, $\lambda_2$, and $\lambda_3$ each correspond to a different primary color; where wavelength $\lambda_1$ is different than wavelengths $\lambda_2$ and $\lambda_3$, and wavelength $\lambda_2$ is different than wavelengths $\lambda_1$ and $\lambda_3$. A primary color is defined as one of any of a set of colors from which all other colors, including white and black, may be derived. The colors red, green, and blue are an example of a set of primary colors. For example, in one embodiment wavelength $\lambda_1$ may be blue, wavelength $\lambda_2$ red, and wavelength $\lambda_3$ green.

Optical Signals 15, 25, and 35 are each approximately linearly polarized and have vertical and horizontal orthogonal polarization components $v_{\lambda,i}$ and $h_{\lambda,i}$, as shown in FIG. 1, where i is an index and $1 \leq i \leq 3$. Optical signals 15, 25, and 35 are described as having vertical and horizontal polarization components $v_{\lambda,i}$ and $h_{\lambda,i}$ only for purposes of articulating the variable-color LED optical source. It is to be understood that the polarization components $v_{\lambda,i}$ and $h_{\lambda,i}$ are orthogonal to each other, but are not limited to only horizontal and vertical orientations. Optical Signal 15 has a horizontal orthogonal polarization component $h_{\lambda,1}$ and a negligible vertical orthogonal polarization component $v_{\lambda,1}$. Optical Signal 25 has a vertical orthogonal polarization component $v_{\lambda,2}$ and a negligible horizontal orthogonal polarization component $h_{\lambda,2}$. Optical Signal 35 has a vertical orthogonal polarization component $v_{\lambda,3}$ and a negligible horizontal orthogonal polarization component $h_{\lambda,3}$. Upon entering the first BSC 40, the h polarization component $h_{\lambda,1}$ of optical signal 15 passes through the first BSC 40 to form part of optical signal 45; and the v polarization component $v_{\lambda,1}$ of optical signal 15 is reflected by the first BSC 40 in a direction orthogonal to optical signal 45 as part of optical signal 43. As optical signal 25 enters the first BSC 40, as shown in FIG. 1, the h polarization component $h_{\lambda,2}$ passes through the first BSC 40 to form part of optical signal 43, and the v component $v_{\lambda,2}$ is reflected and collimated with component $h_{\lambda,1}$ of optical signal 15 to form optical signal 45.

Optical signal 45, comprised of orthogonal polarization components $v_{\lambda,2}$ and $h_{\lambda,1}$ may be transformed into optical signal 65 by passing through the first half-wave plate 60, which is optically coupled to receive optical signal 45 from the first BSC 40 and optically coupled to emit optical signal 65 to the second BSC 80. Rotation of the first half-wave plate 60 will rotate the polarization orientation of optical signal 45 with respect to the second BSC 80, thus altering the amount of components $v_{\lambda,2}$ and $h_{\lambda,1}$ in components $v_{mix}$ and $h_{mix}$ of optical signal 65. For example, if the polarization orientation of optical signal 45 is rotated 45 degrees by the first half-wave plate 60, then component $v_{mix}$ will comprise about equal parts of components $v_{\lambda,2}$ and $h_{\lambda,1}$. Optical signal 65 is disposed to enter the second BSC 80 such that component $h_{mix}$ passes through the second BSC 80 to form part of optical signal 85; and component $v_{mix}$ is reflected in a direction orthogonal to optical signal 85 to form part of optical signal 83.

The third LED 30 is disposed to generate optical signal 35, which comprises orthogonal polarization components $v_{\lambda,3}$ and $h_{\lambda,3}$. Optical signal 35 may be transformed into optical signal 75, having orthogonal polarization components $v_{\lambda,3mix}$ and $h_{\lambda,3mix}$, by passing through the second half-wave plate 70, which is optically coupled to the second BCS 80. Rotating the second half-wave plate 70 rotates the polarization orientation of optical signal 35 with respect to the second BSC 80, thus adjusting the percentage of components $v_{\lambda,3}$ and $h_{\lambda,3}$ that comprise components $v_{\lambda,3mix}$ and $h_{\lambda,3mix}$ of optical signal 75. Optical signal 75 is disposed to enter the second BSC 80 such that the component $v_{\lambda,3mix}$ is reflected and collimated with component $h_{mix}$ to form optical signal 85; and the component $h_{\lambda,3mix}$ passes through the second BSC 80 and is collimated with component $v_{mix}$ to form excess optical signal 83.

The color of optical signal 85 may "tuned" to be any color in the visible spectrum by selectively rotating the first and second half-wave plates 60 and 70 by desired amounts to alter the relative percentages of primary color wavelengths $\lambda_1$, $\lambda_2$, and $\lambda_3$ in optical signal 85. For example, if the first half wave plate 60 is rotated such that component $h_{mix}$ is composed almost entirely of component $h_{\lambda,1}$, and if the second half-wave plate 70 is rotated such that component $v_{\lambda 3mix}$ comprises the negligible horizontal orthogonal polarization component $h_{\lambda 3}$ then the resulting color of optical signal 85 will be the primary color associated with wavelength $\lambda_1$. In one embodiment, the first BSC 40 may be capable of reflecting at least 96% of orthogonal polarization components $v_{\lambda 1}$ and $v_{\lambda 2}$ of optical signals 15 and 25 respectively and transmitting at least 98% of orthogonal polarization components $h_{\lambda 1}$ and $h_{\lambda 2}$ of optical signals 15 and 25 respectively. In another embodiment, the second BSC 80 may be capable of reflecting at least 96% of orthogonal polarization components $v_{mix}$ and $v_{\lambda 3mix}$ of optical signals 65 and 75 respectively and transmitting at least 98% of orthogonal polarization components $h_{\lambda 3mix}$ and $h_{mix}$ of optical signals 75 and 65 respectively.

Figure 2:
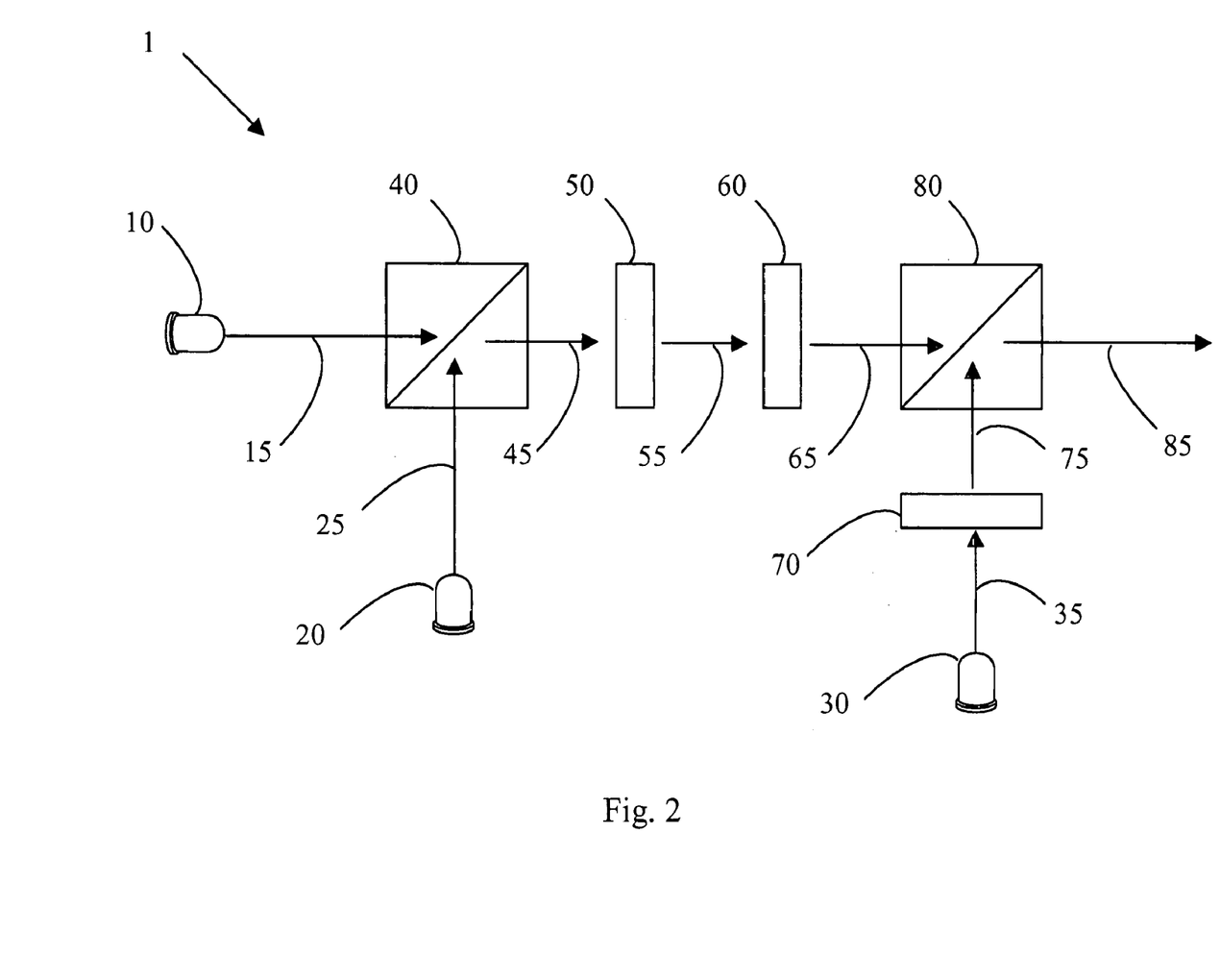
FIG. 2 illustrates another embodiment of a variable-color LED optical source showing three LEDs, two half-wave plates, two beam splitter cubes, and an optical signal attenuator.
Figure 3:
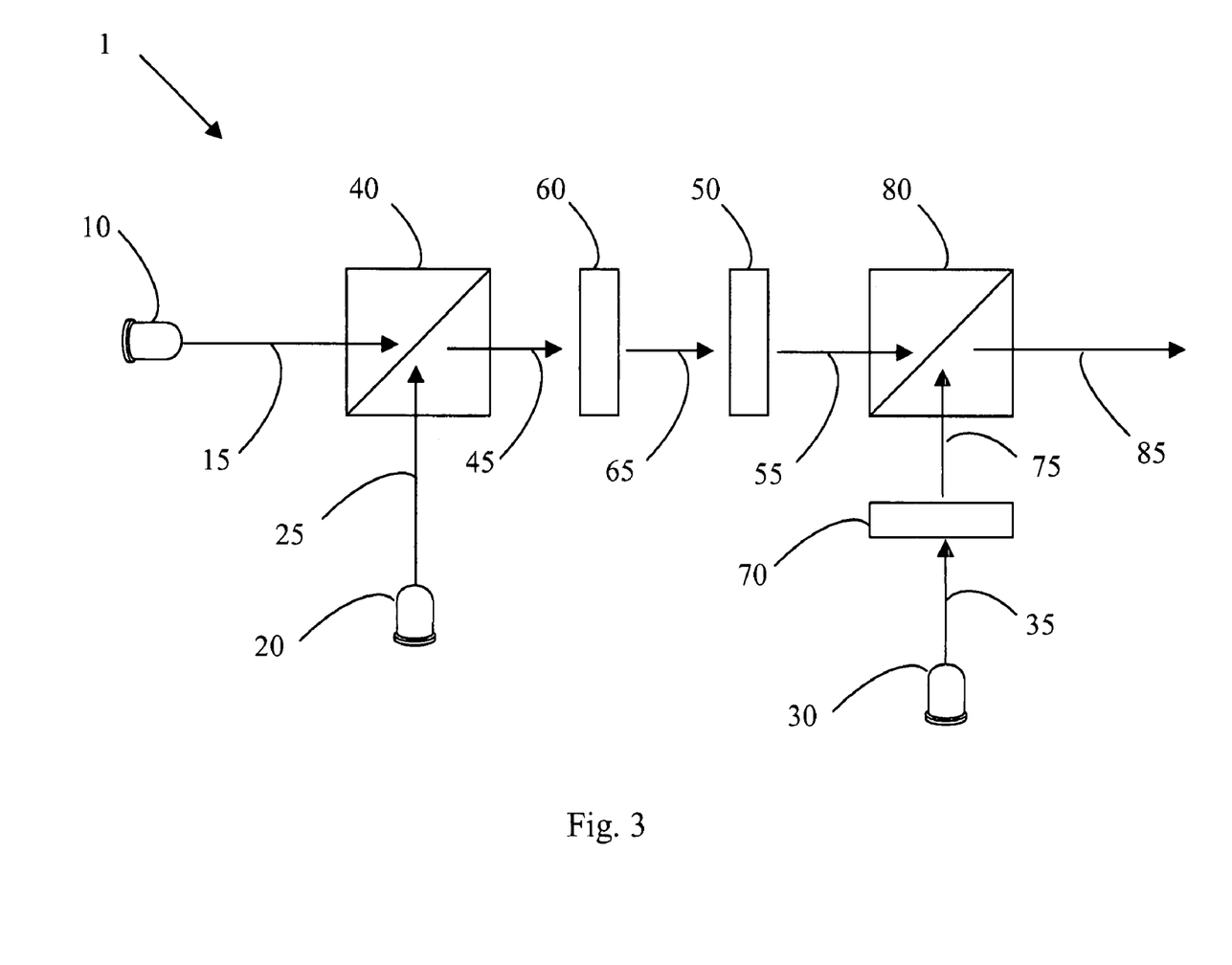
FIG. 3 illustrates another embodiment of a variable-color LED optical source showing an alternative location for an optical signal attenuator.

FIG. 2 shows an optical signal attenuator 50 in another embodiment of system 1. The optical signal attenuator 50 may be optically interposed between the first BSC 40 and the first half-wave plate 60 for attenuating optical signal 45 a desired amount and transforming it into attenuated optical signal 55. However, as shown in FIG. 3, the optical signal attenuator 50 may alternatively be optically interposed between the first half-wave plate 60 and the second BSC 80 for attenuating optical signal 65 a desired amount. The optical signal attenuator 50 may be a thin-film, neutral-density filter, adjustable aperture, or other adjustable optical filter known in the art.

Figure 4:
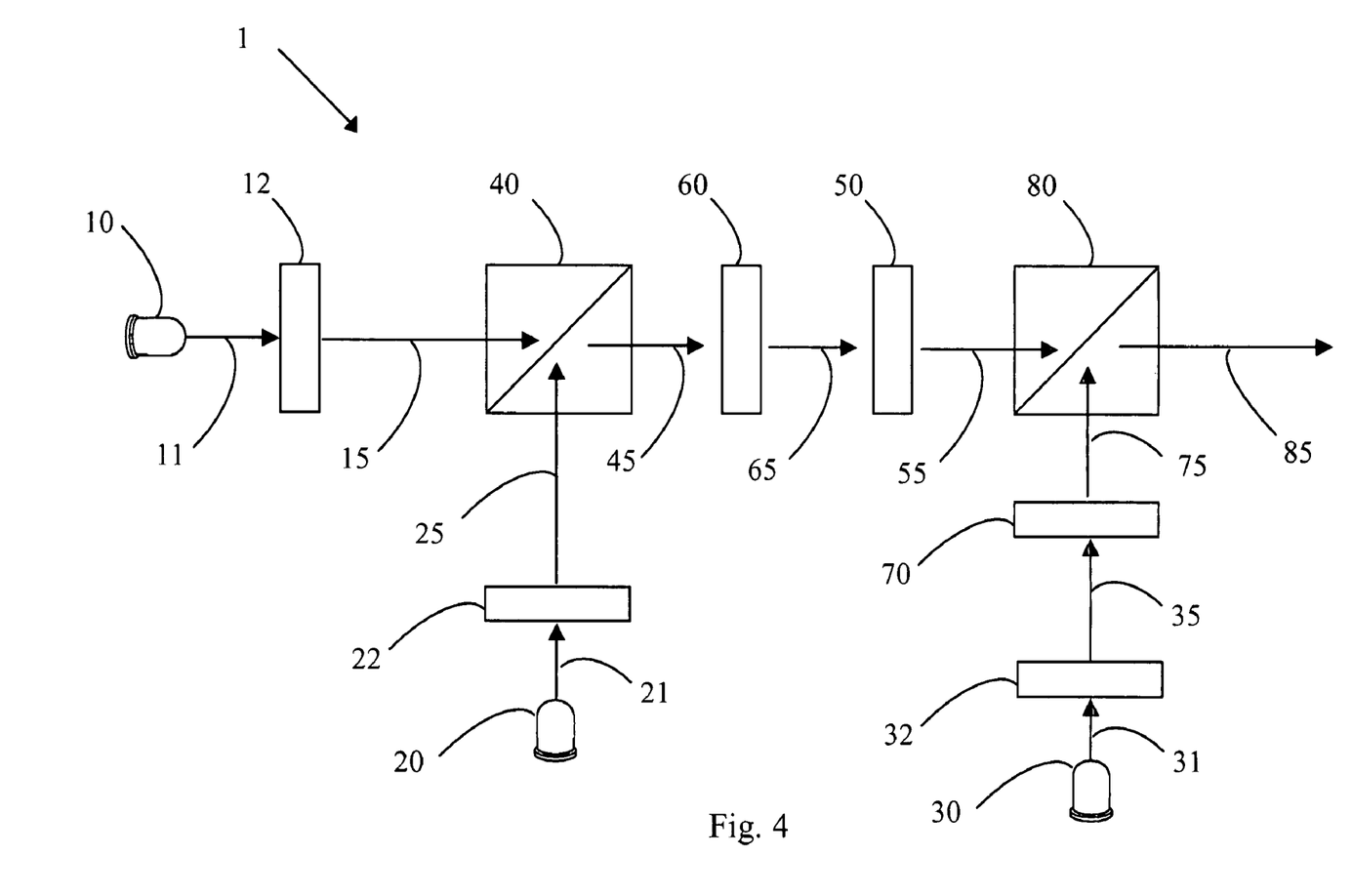
FIG. 4 illustrates another embodiment of a variable-color LED optical source showing three LEDs, two half-wave plates, two beam splitter cubes, an optical signal attenuator, and three optic collimators.

FIG. 4 shows first, second and third optic collimators 12, 22, and 32 in another embodiment of system 1. The first optic collimator 12, which may be optically coupled between the first LED 10 and the first BSC 40, serves to transform uncollimated optical signal 11 into optical signal 15. The second optic collimator 22, which may be optically coupled between the second LED 20 and the first BSC 40, serves to transform uncollimated optical signal 21 into optical signal 25. The third optic collimator 32, which may be optically coupled between the third LED 30 and the second half-wave plate 70, serves to transform uncollimated optical signal 31 into optical signal 35. In practice, optic collimators 12, 22, and 32 may be collimating lenses, groups of lenses, or other optical collimating devices known in the art.

Figure 5:
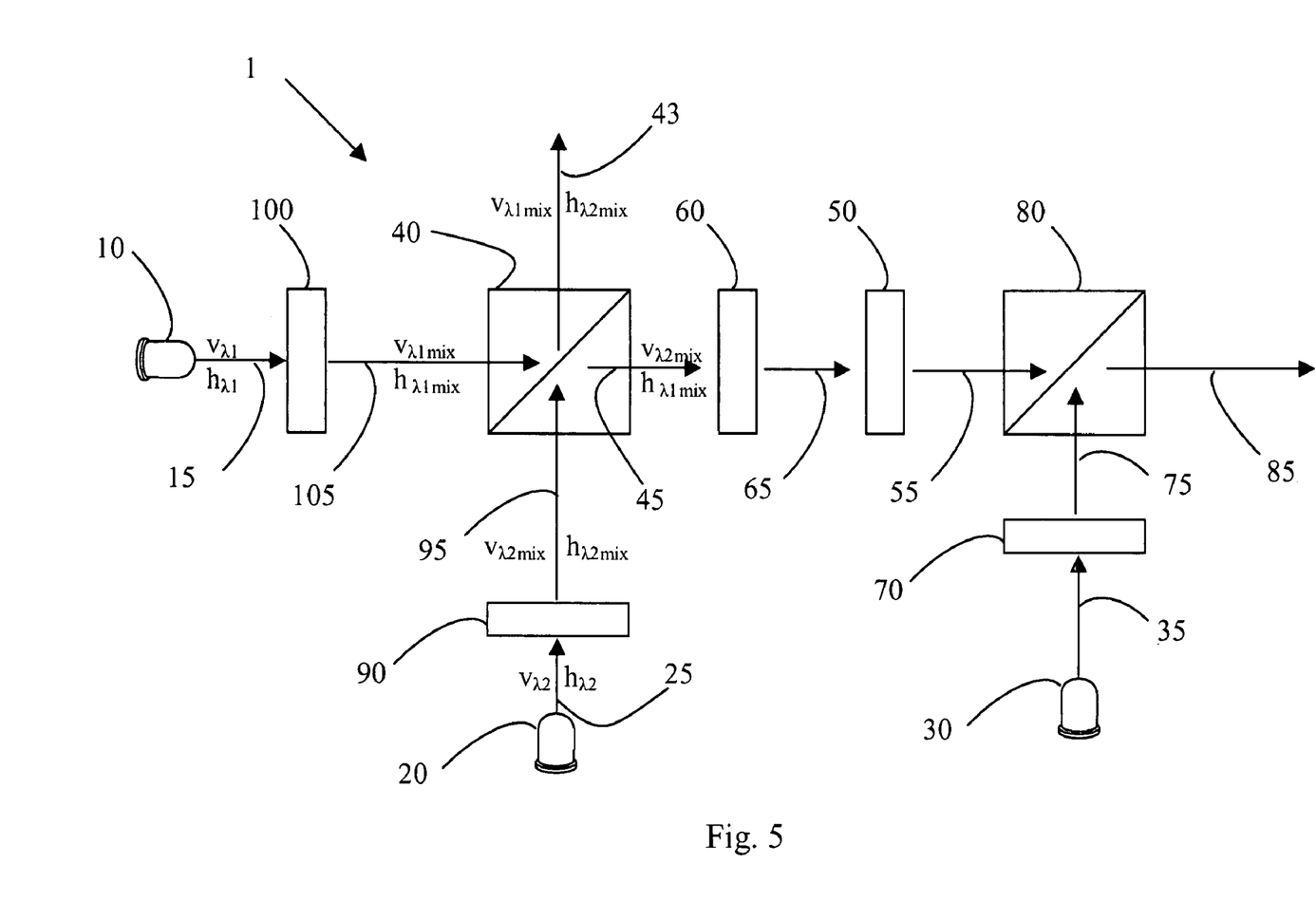
FIG. 5 illustrates another embodiment of a variable-color LED optical source showing three LEDs, four half-wave plates, two beam splitter cubes, and an optical signal attenuator.

FIG. 5 shows another embodiment of system 1 including a third half-wave plate 100 and a fourth half-wave plate 90. The third half-wave plate 100 may be optically interposed between the first LED 10 and the first BSC 40. The third half-wave plate 100 serves to transform optical signal 15 into optical signal 105, which has orthogonal polarization components $v_{\lambda 1mix}$ and $h_{\lambda 1mix}$. Rotating the third half-wave plate 100 rotates the polarization orientation of optical signal 15 with respect to the first BSC 40, thus adjusting the percentage of components $v_{\lambda 1}$ and $h_{\lambda 1}$ that comprise components $v_{\lambda 1mix}$ and $h_{\lambda 1mix}$ of optical signal 105. Accordingly, the intensity of orthogonal polarization component $h_{\lambda 1mix}$, comprising part of optical signals 105 and 45, may be controlled by rotating the third half-wave plate 100.

As shown in FIG. 5, the fourth half-wave plate 90 may be optically interposed between the second LED 20 and the first BSC 40. The fourth half-wave plate 90 may transform optical signal 25 into optical signal 95, which has orthogonal polarization components $v_{\lambda 2mix}$ and $h_{\lambda 2mix}$. Rotating the fourth half-wave plate 90 rotates the polarization orientation of optical signal 25 with respect to the first BSC 40, thus adjusting the percentage of components $v_{\lambda 2}$ and $h_{\lambda 2}$ that comprise components $v_{\lambda 2mix}$ and $h_{\lambda 2mix}$ of optical signal 90. Accordingly, the intensity of orthogonal polarization component $v_{\lambda 2mix}$ comprising part of optical signals 95 and 45 may be controlled by rotating the fourth half-wave plate 90.

Figure 6:
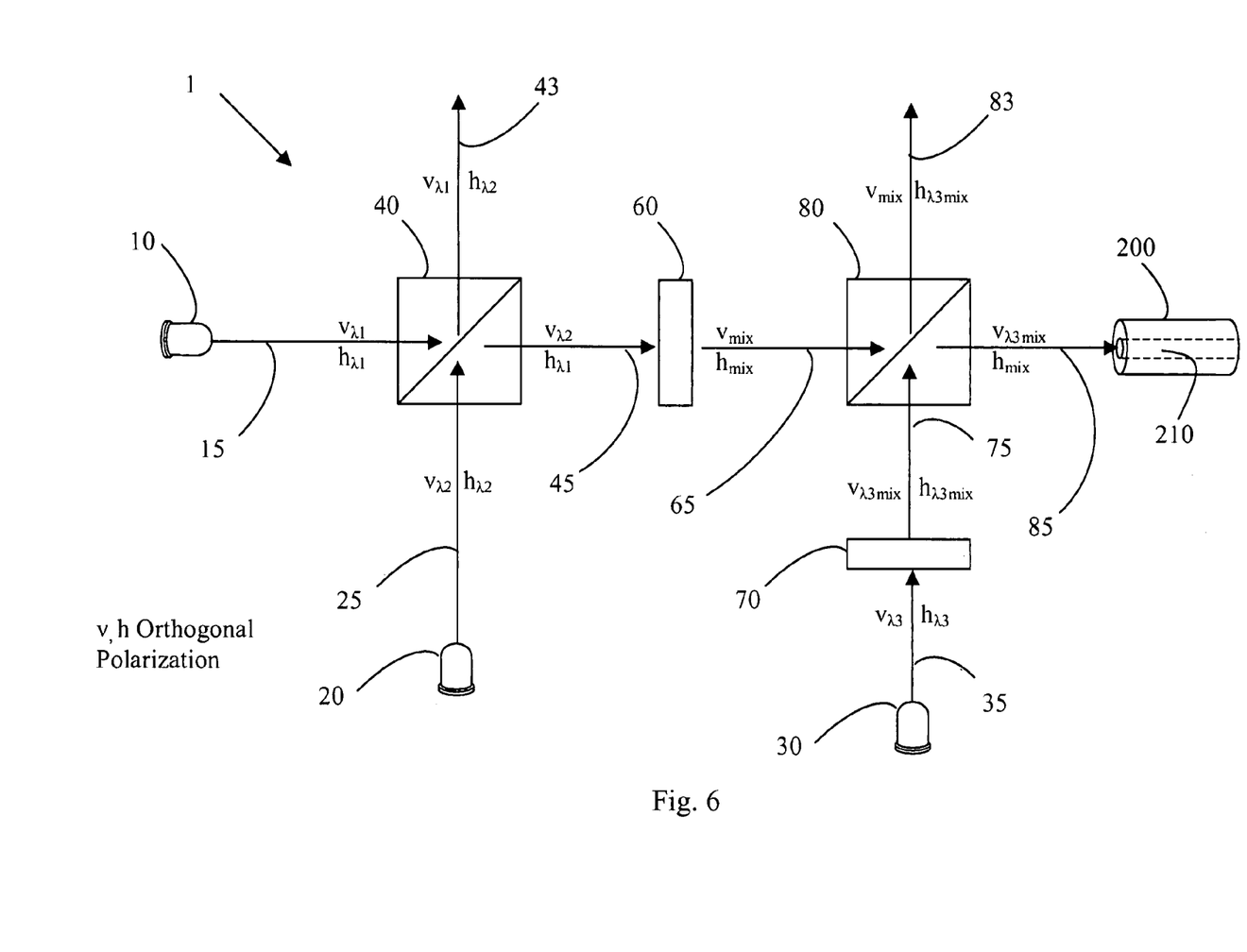
FIG. 6 illustrates another embodiment of a variable-color LED optical source showing three LEDs, two half-wave plates, two beam splitter cubes, and an optical fiber.

FIG. 6 shows another embodiment of system 1 including an optical fiber 200 optically coupled to the second BSC 80. Optical fiber 200 is disposed to allow optical signal 85 to propagate through fiber core 210.

From the above description of the LED optical source, it is manifest that various techniques can be used for implementing the concepts of the LED optical source without departing from its scope. Moreover, while the LED optical source has been described with specific reference to certain embodiments, a person of ordinary skill in the art would recognize that changes may be made in form and detail without departing from the spirit and the scope of the LED optical source. The described embodiments are to be considered in all respects as illustrative and not restrictive. It should also be understood that the LED optical source is not limited to the particular embodiments described herein, but is capable of many rearrangements, modifications, and substitutions without departing from the scope of the LED optical source.

I claim:

1. An apparatus comprising:
    a first LED, disposed to generate a first optical signal that is approximately linearly polarized, wherein the first optical signal has vertical and horizontal polarization components;
    a second LED, disposed to generate a second optical signal that is approximately linearly polarized, wherein the second optical signal has vertical and horizontal polarization components;
    a third LED, disposed to generate a third optical signal that is approximately linearly polarized, wherein the second optical signal has vertical and horizontal polarization components;
    a first beam splitter cube, positioned to receive the first and second optical signals and disposed to output a first output beam wherein the first output beam is a combination of the horizontal and vertical polarization components of the first and second optical signals respectively;
    a first half-wave plate, positioned to receive the first output beam and disposed to output a second output beam wherein the polarization orientation of the first output beam is different than the polarization orientation of the second output beam;
    a second half-wave plate, positioned to receive the third optical signal and disposed to output a third output beam, wherein the polarization orientation of the third optical signal is different than the polarization orientation of the third output beam; and
    a second beam splitter cube, positioned to receive the second and third output beams and disposed to output a fourth output beam, wherein the fourth output beam is a combination of the horizontal and vertical polarization components of the second and third output beams respectively.

2. The apparatus of claim 1, wherein the wavelengths of the first, second, and third optical signals correspond to colors selected from the group consisting of: red, green, and blue.

3. The apparatus of claim 2, wherein the wavelength of the first optical signal corresponds to a different color than the wavelengths of the second and third optical signals, and the wavelength of the second optical signal corresponds to a different color than the wavelengths of the first and third optical signals.

4. The apparatus of claim 3, further comprising:
    a first optic collimator interposed between the first LED and the first beam splitter cube, wherein the first optic collimator is disposed to collimate the first optical signal before the first optical signal enters the first beam splitter cube;

a second optic collimator interposed between the second LED and the first beam splitter cube, wherein the second optic collimator is disposed to collimate the second optical signal before the second optical signal enters the first beam splitter cube; and a third optic collimator interposed between the third LED and the second half-wave plate, wherein the third optic collimator is disposed to collimate the third optical signal before the third optical signal enters the second half-wave plate.

5. The apparatus of claim 3, further comprising:

a third half-wave plate interposed between the first LED and the first beam splitter cube, the third half-wave plate being disposed to rotate the polarization orientation of the first optical signal before the first optical signal enters the first beam splitter cube; and a fourth half-wave plate interposed between the second LED and the first beam splitter cube, the fourth half-wave plate being disposed to rotate the polarization orientation of the second optical signal before the second optical signal enters the first beam splitter cube.

6. The apparatus of claim 3, further comprising:

a first optical signal attenuator, interposed between the first beam splitter cube and the first half-wave plate.

7. The apparatus of claim 6, wherein the first optical signal attenuator is a thin-film, neutral-density filter.

8. The apparatus of claim 6, wherein the first optical signal attenuator is an adjustable aperture.

9. A method for providing a variable color optical source comprising:

generating a first primary color linearly polarized optical signal from a first LED;

generating a second primary color linearly polarized optical signal from a second LED;

collimating a vertical mode of polarization of the first primary color optical signal with a horizontal mode of polarization of the second primary color optical signal in a first beam splitter cube;

emitting a collimated optical signal from the first beam splitter cube;

rotating the polarization orientation of the collimated optical signal with a first half-wave plate;

generating a third primary color linearly polarized optical signal from a third LED;

transforming the third primary color optical signal into a fourth optical signal by rotating the polarization orientation of the third optical signal with a second half-wave plate;

collimating a vertical mode of polarization of the collimated optical signal with a horizontal mode of polarization of the fourth optical signal in a second beam splitter cube; and emitting a variable color optical signal from the second beam splitter cube; and wherein the first half-wave plate is interposed between the first and second beam splitter cubes, and the second half-wave plate is interposed between the third LED and the second beam splitter cube.

10. The method of claim 9, wherein the first, second and third primary color optical signals have wavelengths corresponding to colors selected from the group consisting of: red, green and blue.

11. The method of claim 9, wherein the wavelength of the first primary color optical signal is different than the wavelengths of the second and third primary color optical signals, and the wavelength of the second primary color optical signal is different than the wavelengths of the first and third primary color optical signals.

12. The method of claim 11, further comprising:

rotating the polarization orientation of the first primary color linearly polarized optical signal with a third half-wave plate;

rotating the polarization orientation of the second primary color linearly polarized optical signal with a fourth half-wave plate.

13. The method of claim 12, further comprising:

collimating the first primary color linearly polarized optical signal from the first LED;

collimating the second primary color linearly polarized optical signal from the second LED; and collimating the third primary color linearly polarized optical signal from the third LED.

14. The method of claim 11, further comprising the step of:

attenuating the collimated optical signal emitted from the first beam splitter cube with an optical signal attenuator.

15. The method of claim 11, further comprising the step of allowing the variable color optical signal to propagate through a core of an optical fiber.

16. An apparatus comprising:

a first LED, disposed to generate a first linearly polarized optical signal comprised of first vertical and horizontal polarization components;

a second LED, disposed to generate a second linearly polarized optical signal comprised of second vertical and horizontal polarization components;

a third LED, disposed to generate a third linearly polarized optical signal comprised of third vertical and horizontal polarization components;

a first beam splitter cube, disposed to collimate the second vertical polarization component and the first horizontal polarization component into a collimated optical signal;

a first half-wave plate, disposed to transform the collimated optical signal into an altered optical signal having altered vertical and horizontal polarization components by rotating the polarization orientation of the collimated signal a desired amount;

a second half-wave plate, disposed to transform the third linearly polarized optical signal into an adjusted optical signal having adjusted vertical and horizontal polarization components by rotating the polarization orientation of the third linearly polarized optical signal a desired amount;

a second beam splitter cube, disposed to collimate the adjusted vertical polarization component of the adjusted optical signal and the altered horizontal polarization component of the altered optical signal into a final collimated optical signal; and wherein the first half-wave plate is interposed between the first and second beam splitter cubes, and the second half-wave plate is interposed between the third LED and the second beam splitter cube.

17. The apparatus of claim 16, wherein the wavelengths of the first, second, and third linearly polarized optical signals correspond to primary colors selected from the group consisting of: red, green, and blue.

18. The apparatus of claim 17, wherein the wavelength of the first linearly polarized optical signal corresponds to a different primary color than the wavelengths of the second and third linearly polarized optical signals, and the wavelength of the second linearly polarized optical signal corresponds to a different primary color than the wavelengths of the first and third linearly polarized optical signals.

19. The apparatus of claim 18, further comprising:
a first optical signal attenuator, interposed between the first beam splitter cube and the first half-wave plate.

20. The apparatus of claim 19, further comprising an optical fiber having a core, wherein the optical fiber is optically coupled to the second beam splitter cube, and wherein the optical fiber is configured to allow the final collimated optical signal to propagate through the core.

* * * * *